(12) United States Patent
Klee et al.

(10) Patent No.: US 10,025,606 B2
(45) Date of Patent: Jul. 17, 2018

(54) ENABLING FILTER-LEVEL ACCESS TO VIRTUAL DISKS

(71) Applicant: VMware, Inc., Palo Alto, CA (US)

(72) Inventors: Christoph Klee, Snoqualmie, WA (US); Adrian Drzewiecki, Mountain View, CA (US)

(73) Assignee: VMWARE, INC., Palo Alto, CA (US)

( * ) Notice: Subject to any disclaimer, the term of this patent is extended or adjusted under 35 U.S.C. 154(b) by 349 days.

(21) Appl. No.: 14/686,558

(22) Filed: Apr. 14, 2015

(65) Prior Publication Data

US 2016/0306643 A1    Oct. 20, 2016

(51) Int. Cl.
| | | |
|---|---|---|
| *G06F 3/00* | (2006.01) | |
| *G06F 5/00* | (2006.01) | |
| *G06F 13/00* | (2006.01) | |
| *G06F 9/455* | (2018.01) | |
| *G06F 3/06* | (2006.01) | |
| *G06F 9/54* | (2006.01) | |

(52) U.S. Cl.
CPC ........ *G06F 9/45545* (2013.01); *G06F 3/0619* (2013.01); *G06F 3/0665* (2013.01); *G06F 3/0689* (2013.01); *G06F 9/45558* (2013.01); *G06F 9/54* (2013.01); *G06F 9/545* (2013.01); *G06F 2009/45579* (2013.01)

(58) Field of Classification Search
CPC ............... G06F 9/455; G06F 2201/815; G06F 2212/151; G06F 2212/50
USPC ......................................................... 710/36
See application file for complete search history.

(56) References Cited

U.S. PATENT DOCUMENTS

| | | | | |
|---|---|---|---|---|
| 2006/0291449 A1* | 12/2006 | Babbar | .................. | H04L 47/10 370/352 |
| 2008/0084631 A1* | 4/2008 | Chan | .................. | G11B 33/1446 360/97.16 |
| 2008/0123676 A1* | 5/2008 | Cummings | ........... | H04L 45/742 370/419 |
| 2010/0036889 A1* | 2/2010 | Joshi | ................. | G06F 17/30194 707/821 |
| 2012/0124305 A1* | 5/2012 | Weissman | ........... | G06F 12/0223 711/160 |
| 2013/0080773 A1* | 3/2013 | Lu | ........................ | G06F 21/6209 713/165 |
| 2013/0117516 A1* | 5/2013 | Sobolewski | ............ | G06F 12/16 711/162 |
| 2014/0012940 A1* | 1/2014 | Joshi | ................... | G06F 9/45558 709/214 |

* cited by examiner

*Primary Examiner* — Farley Abad
*Assistant Examiner* — Getente A Yimer

(57) ABSTRACT

Techniques for enabling filter-level access to a virtual disk (VMDK) are provided. In one set of embodiments, an application can invoke a first application programming interface (API) for opening the VMDK, the invoking of the first API causing an ordered group of filters associated with the VMDK to be instantiated. The application can further coordinate with a target filter in the ordered group of filters to establish a communication channel with the target filter and can receive, from the target filter, a handle to the target filter via the communication channel. The application can then issue an I/O request to the VMDK via the target filter using the handle, the issuing causing data associated with the I/O request to be filtered by other filters that are downstream from the target filter in the ordered group.

15 Claims, 5 Drawing Sheets

ENABLING FILTER-LEVEL ACCESS TO VIRTUAL DISKS

BACKGROUND

Unless otherwise indicated herein, the approaches described in this section are not prior art to the claims of the present application and are not admitted to be prior art by inclusion in this section.

In the field of computer data storage, filtering refers to the process of manipulating, by one or more objects known as filters, data that is read from or written to a storage device/volume. Examples of manipulation functions that can be performed by such filters include compression, encryption, caching, replication, and so on.

In a virtualized environment, filtering may be performed on I/O reads and writes that are directed to virtual disks (VMDKs). There are a number of ways in which this VMDK I/O filtering can be implemented. According to a first approach, a hypervisor of a host system can include one or more filters within the vSCSI layer of its kernel I/O stack. When a virtual machine (VM) running on top of the hypervisor issues, e.g., an I/O write request directed to a VMDK, the write request can pass through the kernel I/O stack and can be intercepted by the filters in the vSCSI layer. These vSCSI filters can then manipulate the data associated with the write request before it is committed to the storage device storing the VMDK.

According to a second approach, VMDK I/O filtering can be performed in user space, rather than at the hypervisor vSCSI layer. In this approach, each VMDK can be associated with metadata identifying a list of filters that should be applied, in order, to I/O requests directed to the VMDK. When a VM first opens a VMDK, a filter framework component can be instantiated in a user-level process of the VM (e.g., the VM's VMX process). The filter framework component can include the various filters associated with that VMDK. When the VM subsequently issues, e.g., an I/O write request to the VMDK, the hypervisor's kernel I/O stack can pass the write request to the VM's filter framework component in user space, which can cause the filters to be applied to the data associated with the write request. Once the filters have been applied, the write request can be returned to the kernel I/O stack for forwarding to the storage device.

An advantage of performing VMDK I/O filtering in a manner that does not involve the vSCSI layer per the second approach above is that it facilitates filtering of both online (i.e., VM initiated) and offline (i.e., non-VM initiated) I/O. For example, assume an application (e.g., a backup application, a cache de-staging application, etc.) wishes to perform I/O operations directly against a VMDK while its corresponding VM is powered off. Such an application is referred to herein as an offline application. In this case, the filter framework component can be instantiated in the user memory space of the offline application at the point the application opens the VMDK. This instantiation can be performed by, e.g., a "DiskOpen" API that is exposed by the hypervisor and called by the offline application. The offline application can then issue I/O requests to the VMDK using a VMDK-level "IOSubmit" API that take as input a VMDK handle returned by the DiskOpen API. The issuance of the I/O requests to the VMDK using the VMDK-level IOSubmit API (with the VMDK handle as an input parameter) can cause the filter framework component to pass the data associated with the requests through each of the VMDK's filters, thereby ensuring that the request data is filtered before (and/or after) reaching the storage tier. This is not possible with the first filtering approach, since the first approach requires all VMDK I/O to originate from a running VM (and thus pass through the hypervisor vSCSI layer) in order to be filtered.

One problem that may occur when an offline application interacts with a VMDK using the VMDK-level IOSubmit API described above is that certain destructive I/O filters may be inadvertently applied to write data more than once. For instance, consider a scenario in which a VMDK is associated with a compression filter, an encryption filter, and a caching filter, in that order. The compression and encryption filters are destructive in the sense that they modify the input data they are applied to. Assume that a VM interacts with the VMDK for a period of time, which causes write requests originating from the VM to be filtered by this group of filters (i.e., the write data is compressed, then encrypted, then cached in a writeback cache). Further assume that the VM is powered off before the cached data can be de-staged (i.e., propagated from the writeback cache to backend storage), which causes a cache de-staging application to initiate an offline de-staging process.

In this scenario, the write data in the writeback cache is already compressed and encrypted. However, when the cache de-staging application begins copying the write data from the writeback cache to the VMDK using the VMDK-level IOSubmit API, the filter framework component will pass the data through every filter of the VMDK, including the compression and encryption filters. This means that the write data will be compressed and encrypted twice before being committed to backend storage, resulting in data corruption.

DETAILED DESCRIPTION

Figure 1:
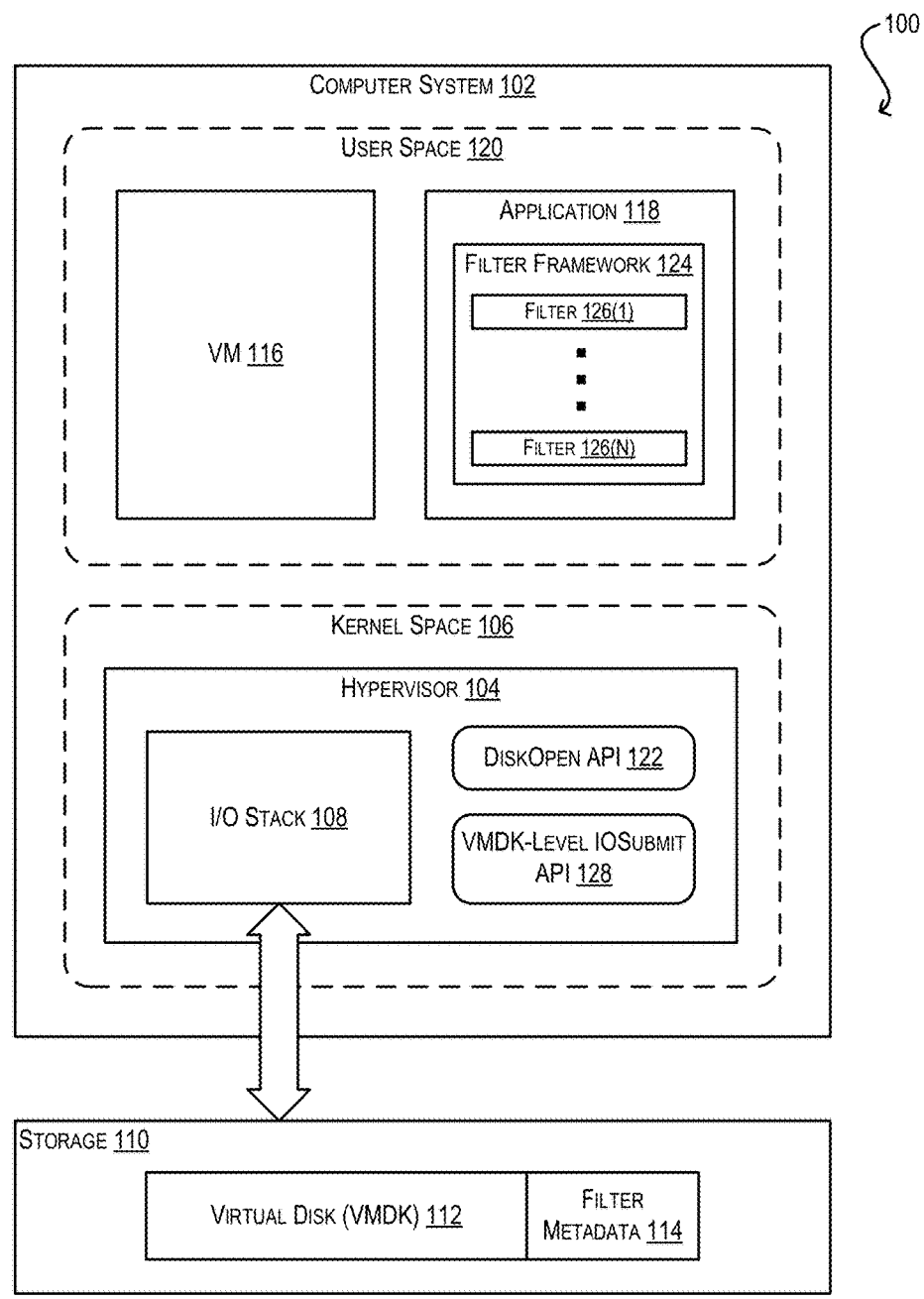
FIGS. 1 and 2 depict a system environment according to an embodiment.

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

1. Overview

The present disclosure provides techniques that enable an application to read from/write to a VMDK at the level of a particular filter (i.e., target filter) associated with the VMDK. Stated another way, these techniques allow the application to issue I/O requests to the VDMK via the target filter, which allows the application to effectively bypass the filtering performed by the target filter and other filters associated with the VMDK that may be upstream of the target filter in the I/O path.

In one set of embodiments, at a time an application wishes to access a VMDK, the application can invoke a first API for opening the VMDK (e.g., a DiskOpen API). The DiskOpen API can instantiate a filter framework component that includes an ordered group of filters associated with the VMDK.

Once the DiskOpen API has been invoked, the application can coordinate/communicate with a particular target filter in the ordered group of filters associated with the VMDK. Through this coordination/communication, the application can obtain, from the target filter, a unique handle for the filter that grants access to the VMDK (referred to herein as a "filter disk handle"). There are different ways in which this coordination/communication can be achieved, such as via global data structures/variables, sockets, or the like.

Finally, upon obtaining the filter disk handle, the application can use it to issue I/O requests to the VMDK via the target filter. For example, in a particular embodiment, the application can invoke a second API (referred to as a filter-level IOSubmit API) that takes as input a write or read request and the filter disk handle (rather than a VMDK handle). This invocation can cause the application's filter framework component to pass the data associated with the I/O request through filters that are downstream from the target filter in the ordered filter group. For instance, if there are N total filters in the ordered filter group and the target filter is filter M, the invocation of the filter-level IOSubmit API can cause the I/O request to be issued by filter M to downstream filters, such that the request is processed by filter M+1, filter M+2, and so on until filter N. Once the I/O request data has been passed through filters M+1 to N, it can be forwarded as appropriate so that it may be persisted in storage (in the case of a write request) or returned to the application (in the case of a read request).

With the techniques described above, an application that wishes to access a VMDK associated with an ordered group of filters can direct its I/O requests to a specific subset of those filters (i.e., filters that are downstream from the target filter in the ordered group). Filters that are upstream from the target filter, and the target filter itself, are not applied. This can avoid the problem noted in the Background section where destructive filters are erroneously applied to I/O request data more than once. For example, if a VMDK is associated with a compression filter, an encryption filter, and a caching filter in that order, an offline application configured to de-stage cached data for the VMDK (which is already compressed and encrypted in the cache) can use the foregoing techniques to issue write requests via the caching filter. This ensures that the upstream compression and encryption filters are not re-applied to the cached data during the de-staging process, thereby avoiding data corruption.

Further, in certain embodiments, the techniques of the present disclosure can make VMDK access more secure by preventing applications from issuing I/O requests to VMDKs using mechanisms other than the filter-level IOSubmit API noted above. This can be accomplished in a number of ways, such as by removing or making private the VMDK-level IOSubmit API, and/or by modifying/replacing the DiskOpen API so that it no longer returns a VMDK handle to a calling application. With these restrictions in place, the only way for an application to issue I/O requests to a VMDK is via a filter disk handle for a specific target filter (which, as mentioned, requires coordination between the application and the target filter). Thus, any applications that are not specifically configured to implement this coordination will not be able to read from/write to the VMDK. Similarly, any VMDKs that are not associated with the target filter will not be accessible by the application, since the target filter will not be instantiated within the application's filter framework component when the VMDK opened (and thus will be unable to communicate/coordinate with the application to provide its filter disk handle).

These and other aspects of the present disclosure are described in further detail in the sections that follow.

2. System Environment

FIG. 1 depicts a system environment 100 according to an embodiment. As shown, system environment 100 comprises a computer system 102 executing a hypervisor 104 within kernel space 106. Hypervisor 104 includes an I/O stack 108 that enables I/O with respect to storage objects residing on a connected storage device/component 110. One such storage object is virtual disk (VMDK) 112, which is associated with filter metadata 114. Filter metadata 114 identifies an ordered list of filters (e.g., N total) that should be applied to I/O requests directed to VMDK 112.

In addition to hypervisor 104, computer system 102 executes a virtual machine (VM) 116 and an application 118 within user space 120. VM 116 can be configured to access VMDK 112 during its runtime operation via hypervisor I/O stack 108. Application 118 can be an offline application that is configured to access VMDK 112 via portions of I/O stack 108 while VM 116 is, e.g., powered off or otherwise unavailable. For example, application 118 can be a daemon process that performs one or more offline management operations with respect to VMDK 112, such disk backup, snapshotting, anti-virus/malware scanning, cache de-staging, or the like.

As noted in the Background section, one way in which filtering can be achieved for I/O requests originating from an offline application (like application 118) and directed to a VMDK (like VMDK 112) is by: (1) invoking, by application 118, a DiskOpen API 122 exposed by hypervisor 104 that instantiates a filter framework component 124 in user space 120 (comprising an instance of each filter associated with VMDK 112 per filter metadata 114, shown as filters 126(1)-(N)); and (2) invoking, by application 118 for each I/O request, a VMDK-level IOSubmit API 128 exposed by hypervisor 104 that specifies, as input, the I/O request and a VMDK handle returned by DiskOpen API 122. The invocation of VMDK-level IOSubmit API 128 can cause filter framework component 124 to pass the data associated with the I/O request through each filter 126(1)-(N) in order.

However, a significant drawback with using a VMDK-level API like API 128 for issuing such I/O is that it does not allow application 118 to distinguish which filters 126(1)-(N) should be applied to its I/O requests; instead, every filter 126(1)-(N) is applied to every request. As explained previously, this can be problematic in certain scenarios if one or more of filters 126(1)-(N) are destructive filters (e.g., compression filters, encryption filters, etc.).

Figure 2:
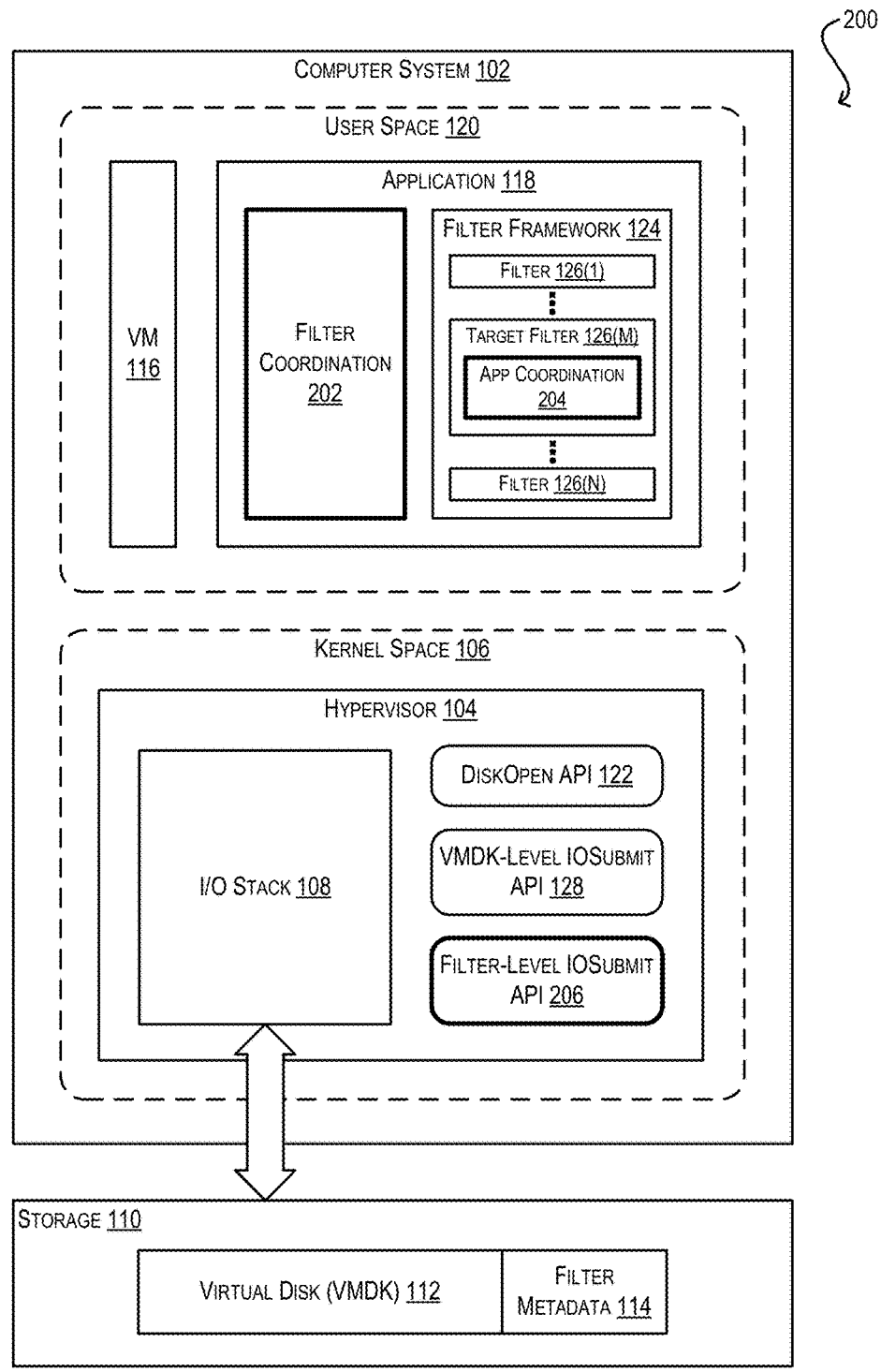

To address the foregoing and other similar issues, system environment 100 can be modified as shown in FIG. 2 to support filter-level access to VMDKs. These modifications (depicted in the context of a new system environment 200) include the implementation of: (1) a filter coordination module 202 in application 118; (2) an app coordination module 204 in a particular filter of filter framework component 124 (shown as "target filter" 126(M)); and a filter-level IOSubmit API 206 in hypervisor 104. As detailed in the next subsection, filter coordination module 202 and app coordination module 204 can work in concert to pass a unique handle for target filter 126(M) to application 118. Application 118 can then use the obtained filter disk handle to issue I/O requests to VMDK 112 via target filter 126(M) using, e.g., filter-level IOSubmit API 206 (rather than to VMDK 112 as a whole via VMDK-level IOSubmit API 128). This causes the I/O requests to be filtered by downstream filters 126(M+1) to 126(N). In this way, application 118 can ensure filters upstream of target filter 126(M) (i.e., filters 126(1)-(M−1)) and the target filter itself are not applied to its I/O requests, thereby avoiding filters that may be problematic in view of the application's processing context.

It should be appreciated that FIGS. 1 and 2 are illustrative and not intended to limit the embodiments disclosed herein. For example, in certain embodiments, filter framework component 124 can run in kernel space 106 rather than user space 120. Further, the various entities shown in FIGS. 1 and 2 may be arranged according to other configurations and/or may include subcomponents or functions that have not been specifically described. One of ordinary skill in the art will recognize many variations, modifications, and alternatives.

3. High-Level Workflow

Figure 3:
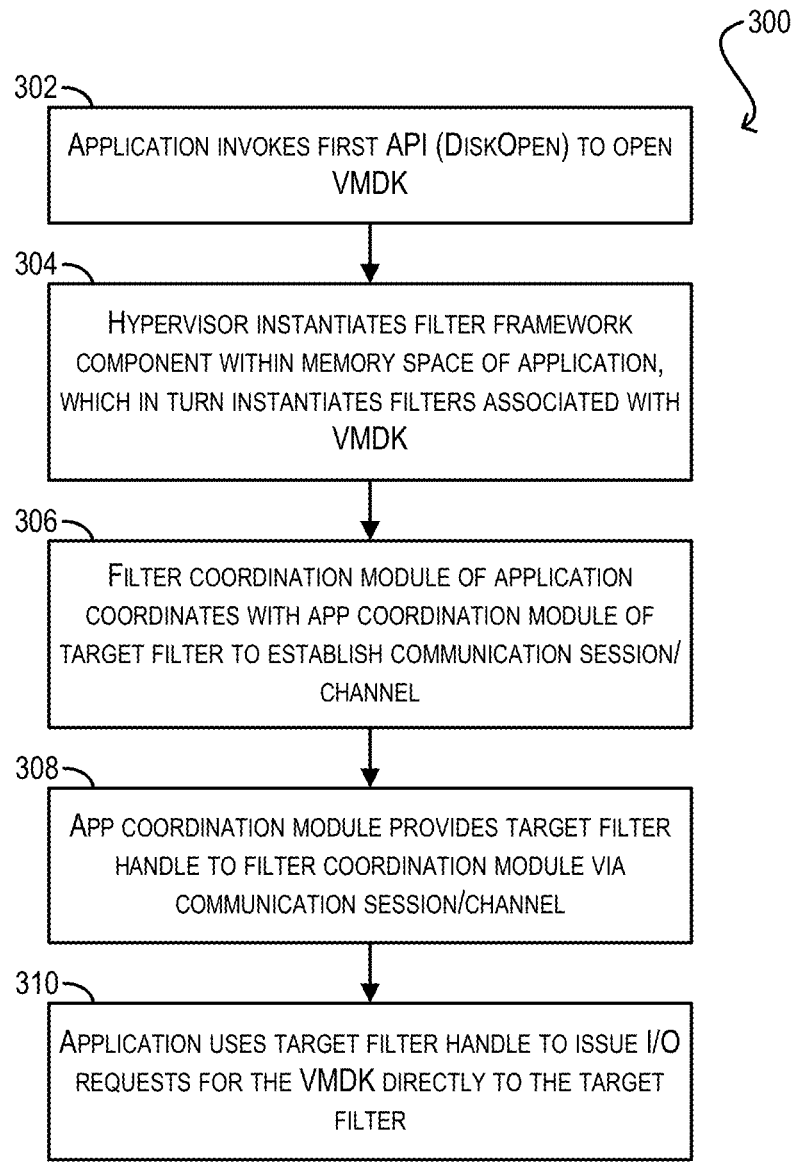
FIG. 3 depicts a workflow for enabling filter-level access to VMDKs according to an embodiment.

FIG. 3 depicts a high-level workflow 300 that can be carried out by application 118/filter coordination module 202, hypervisor 104, and target filter 126(M)/app coordination module 204 of FIG. 2 that allows application 118 to access VMDK 112 at the level of target filter 126(M) according to an embodiment.

Starting with step 302, when application 118 wishes to begin I/O operations against VMDK 112, application 118 can invoke DiskOpen API 122 (or a variant thereof) to open the VMDK. In one embodiment, this invocation may cause DiskOpen API 122 to return a handle for VMDK 112 to application 118. In other embodiments, DiskOpen API 122 (or said variant of API 122) may be specifically configured to not return a VMDK handle to application 118 (discussed in further detail in subsection 5 below).

At step 304, upon receiving the invocation of API 122, hypervisor 104 can instantiate filter framework component 124 within the memory space of application 118 (or as a separate user process associated with application 118). This, in turn, causes one instance of each filter 126(1)-126(N) associated with VMDK 112 (per filter metadata 114) to be instantiated within filter framework component 124.

Once target filter 126(M) has been instantiated, filter coordination module 202 of application 118 can coordinate with app coordination module 204 of target filter 126(M) to establish a communication session/channel between the two (step 306). There are various ways in which this can be accomplished. For example, in one embodiment, filter coordination module 202 can place a predefined command or piece of data in a global/environment data structure or variable, and app coordination module 204 can look for this predefined command/data in said data structure or variable, thereby initiating a dialogue. In another embodiment, filter coordination module 202 can establish a socket connection with app coordination module 204 at a predefined socket address. Other communication methods/mechanisms are also possible and are contemplated to be within the scope of the present disclosure.

It should be noted that step 306 assumes application 118 and target filter 126(M) are designed to intercommunicate/interoperate in a mutually agreed-upon manner. For instance, application 118 may be a daemon process for target filter 126(M), and thus may be specifically configured to interoperate with filter 126(M). If application 118 and target filter 126(M) are not designed to interoperate, step 306 will fail and the workflow will end.

Once the communication session/channel has been successfully established, app coordination module 204 can provide a filter disk handle that is uniquely associated with target filter 126(M) to filter coordination module 202 via the established session/channel (step 308).

Finally, at step 310, application 118 can use the filter disk handle to issue I/O requests to VMDK 112 via target filter 126(M). In one embodiment, this can be performed by invoking, for each I/O request, filter-level IOSubmit API 206 with the I/O request and the filter disk handle as input parameters (see subsection 4 below). In other embodiments, this can be performed via other techniques (e.g., by directly sending the I/O request and filter disk handle through the established communication session/channel). Regardless of how step 310 is implemented, the end result is that the data associated with each I/O request can be filtered in order through filters 126(M+1)-126(N) of filter framework component 124, without being filtered by upstream filters 126(1)-126(M−1) or target filter 126(M). The filtered request data can then be forwarded as appropriate to the next stage in the I/O path.

4. Issuing I/O Requests to the Target Filter

Figure 4:
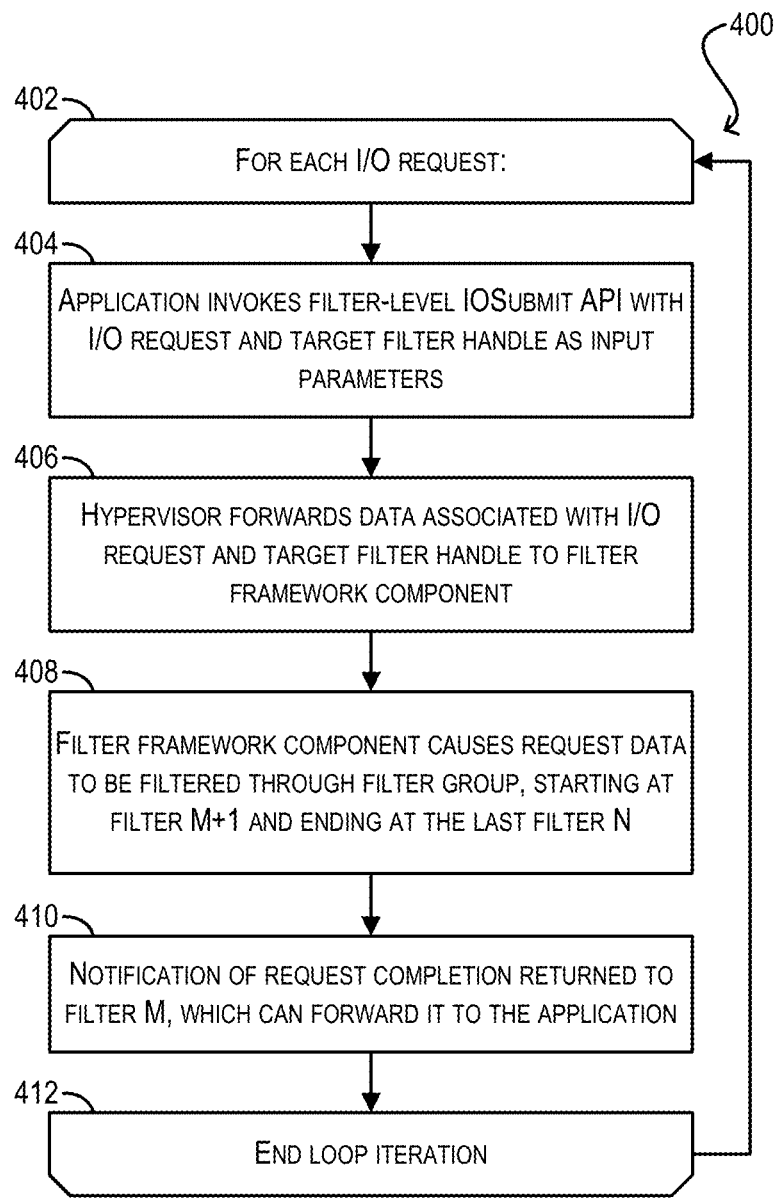
FIG. 4 depicts a workflow for issuing I/O requests to a VMDK at the level of a particular target filter according to an embodiment.

As noted above, there are different ways in which application 118 can issue I/O requests to target filter 126(M) at step 310 of workflow 300. FIG. 4 depicts a workflow 400 that involves the use of filter-level IOSubmit API 206 of FIG. 2 according to an embodiment. Workflow 400 assumes that application 118 has obtained the handle to target filter 126(M) per step 308 of workflow 300.

Starting with step 402 of workflow 400, application 118 can enter a loop for each I/O request destined for VMDK 112. Within the loop, application 118 can invoke filter-level IOSubmit API 206 with the I/O request and the handle for target filter 126(M) as input parameters (step 404).

In response to the invocation of API 206, hypervisor 104 can forward the data associated with the I/O request and the filter disk handle to filter framework component 124 (step 406). Filter framework component 124 can then cause the I/O request to be issued by target filter 126(M) and filtered by downstream filters 126(M+1) to 126(N) (step 408).

Finally, a notification of request completion can be returned to target filter 126(M), which can forward it to application 118 (step 410). The current loop iteration can subsequently end (step 412), and workflow 400 can return to the start of the loop (step 402) so that application 118 may issue additional I/O requests if needed.

It should be appreciated that workflows 300 and 400 of FIGS. 3 and 4 are illustrative and various modifications are possible. For example, while these workflows refer to APIs 122 and 206 as "DiskOpen" and "IOSubmit" APIs respectively, these API names are exemplary and not intended to limit embodiments of the present disclosure. Further, in certain embodiments, APIs 122 and/or 206 may be split into multiple APIs, such as separate "Read" and "Write" APIs.

Yet further, although specific sequences of steps are shown in workflows 300 and 400, other sequences of steps may be performed in other embodiments. For example, steps described as sequential can be executed in parallel, order of steps can be varied, and steps may be modified, combined, added, or omitted. One of ordinary skill in the art will recognize many variations, modifications, and alternatives.

5. Improving VMDK Access Security

Generally speaking, the techniques described above for enabling filter-level access to VMDKs provide a measure of access security because application 118 cannot obtain the filter disk handle for target filter 126(M) without being specifically designed to coordinate/communicate with target filter 126(M) (and vice versa). Similarly, application 118 cannot obtain the filter disk handle if target filter 126(M) is not associated with VMDK 112 (since target filter 126(M) will not be instantiated in filter framework component 124 in that case). This means that arbitrary applications cannot use these techniques to issue filter-level I/O requests to arbitrary VMDKs.

Figure 5:
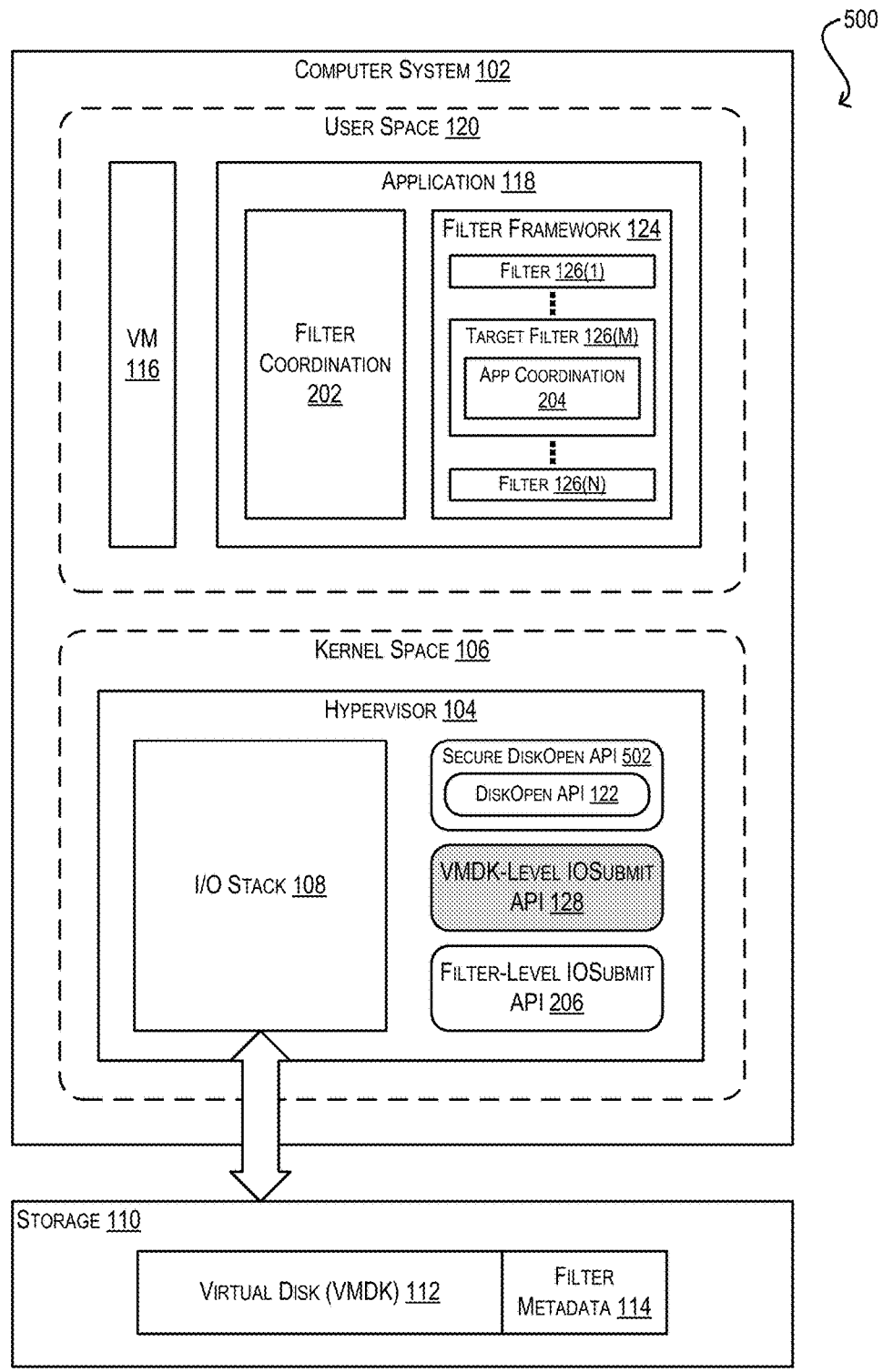
FIG. 5 depicts an alternative version of the system environment of FIG. 2 according to an embodiment.

To further enhance VMDK access security, aspects of system environment 200 can be modified to ensure that application 118 cannot read from/write to VMDK 112 at all using any mechanism other than the filter-specific mechanisms (e.g., filter-level API 206) described above. For example, FIG. 5 depicts a version of system environment 200 (referenced as environment 500) in which VMDK-level IOSubmit API 128 is removed or otherwise hidden/made private from application 118, thereby preventing application 118 from invoking it. This is depicted by "graying out" API 128. In addition, DiskOpen API (which, as mentioned previously, may return a VMDK handle to its calling application) is wrapped by a separate "Secure DiskOpen" API 502, which does not return such a VMDK handle. Secure DiskOpen API 502 can be made available to application 118 for opening a VMDK (per, e.g., step 302 of FIG. 3), rather than DiskOpen API 122.

With the modifications shown in FIG. 5, application 118 cannot read from/write to VMDK 112 at all at the VMDK-level because application 118 cannot obtain a handle to the VMDK via API 122, or issue VMDK-level I/O requests via API 128. Thus, in this embodiment, the only way for application 118 to access VMDK 112 is via the filter disk handle that it obtains from target filter 126(M), which requires explicit coordination between the application and the target filter.

Certain embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Yet further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

In addition, while certain virtualization methods referenced herein have generally assumed that virtual machines present interfaces consistent with a particular hardware system, persons of ordinary skill in the art will recognize that the methods referenced can be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, certain virtualization operations can be wholly or partially implemented in hardware.

Many variations, modifications, additions, and improvements are possible, regardless of the degree of virtualization. The virtualization software can therefore include components of a host, console, or guest operating system that performs virtualization functions. Plural instances can be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A method for enabling filter-level access to a virtual disk (VMDK), the method comprising:
    invoking, by an application running on a computer system, a first application programming interface (API) for opening the VMDK, the invoking of the first API causing an ordered group of filters associated with the VMDK to be instantiated;
    coordinating, by the application, with a target filter in the ordered group of filters to establish a communication channel between the application and the target filter;
    receiving, by the application from the target filter, a handle to the target filter via the communication channel, the handle being a reference or identifier that is uniquely associated with the target filter; and issuing, by the application, an I/O request to the VMDK via the target filter by specifying the handle, the issuing causing data associated with the I/O request to be filtered by all other filters that are downstream from the target filter in the ordered group while bypassing the target filter and all other filters that are upstream from the target filter in the ordered group, wherein the first API does not return a VMDK handle to the application, and wherein the application does not have access to any APIs that enable the application to issue I/O requests directly to the VMDK using a VMDK handle.

2. The method of claim 1 wherein the coordinating comprises:

placing a predefined command or data in a global data structure accessible to the target filter.

3. The method of claim 1 wherein the coordinating comprises:

opening a socket connection at a predefined socket address known to the target filter.

4. The method of claim 1 wherein the issuing comprises: invoking a second API that takes as input the I/O request and the handle to the target filter.

5. The method of claim 1 wherein the issuing comprises: passing the I/O request and the handle to the target filter over the communication channel.

6. A non-transitory computer readable storage medium having stored thereon program code executable by computer system, the program code embodying a method for enabling filter-level access to a virtual disk (VMDK), the method comprising:

invoking, by an application running on the computer system, a first application programming interface (API) for opening the VMDK, the invoking of the first API causing an ordered group of filters associated with the VMDK to be instantiated;

coordinating, by the application, with a target filter in the ordered group of filters to establish a communication channel between the application and the target filter;

receiving, by the application from the target filter, a handle to the target filter via the communication channel, the handle being a reference or identifier that is uniquely associated with the target filter; and issuing, by the application, an I/O request to the VMDK via the target filter by specifying the handle, the issuing causing data associated with the I/O request to be filtered by all other filters that are downstream from the target filter in the ordered group while bypassing the target filter and all other filters that are upstream from the target filter in the ordered group, wherein the first API does not return a VMDK handle to the application, and wherein the application does not have access to any APIs that enable the application to issue I/O requests directly to the VMDK using a VMDK handle.

7. The non-transitory computer readable storage medium of claim 6 wherein the coordinating comprises:

placing a predefined command or data in a global data structure accessible to the target filter.

8. The non-transitory computer readable storage medium of claim 6 wherein the coordinating comprises:

opening a socket connection at a predefined socket address known to the target filter.

9. The non-transitory computer readable storage medium of claim 6 wherein the issuing comprises:

invoking a second API that takes as input the I/O request and the handle to the target filter.

10. The non-transitory computer readable storage medium of claim 6 wherein the issuing comprises:

passing the I/O request and the handle to the target filter over the communication channel.

11. A computer system comprising:

a processor; and an application running on the processor, wherein the application is configured to:

invoke a first application programming interface (API) for opening a virtual disk (VMDK), the invoking of the first API causing an ordered group of filters associated with the VMDK to be instantiated;

coordinate with a target filter in the ordered group of filters to establish a communication channel between the application and the target filter;

receive, from the target filter, a handle to the target filter via the communication channel, the handle being a reference or identifier that is uniquely associated with the target filter; and issue an I/O request to the VMDK via the target filter by specifying the handle, the issuing causing data associated with the I/O request to be filtered by all other filters that are downstream from the target filter in the ordered group while bypassing the target filter and all other filters that are upstream from the target filter in the ordered group, wherein the first API does not return a VMDK handle to the application, and wherein the application does not have access to any APIs that enable the application to issue I/O requests directly to the VMDK using a VMDK handle.

12. The computer system of claim 11 wherein the coordinating comprises:

placing a predefined command or data in a global data structure accessible to the target filter.

13. The computer system of claim 11 wherein the coordinating comprises:

opening a socket connection at a predefined socket address known to the target filter.

14. The computer system of claim 11 wherein the issuing comprises:

invoking a second API that takes as input the I/O request and the handle to the target filter.

15. The computer system of claim 11 wherein the issuing comprises:

passing the I/O request and the handle to the target filter over the communication channel.

* * * * *